Patented Nov. 28, 1944

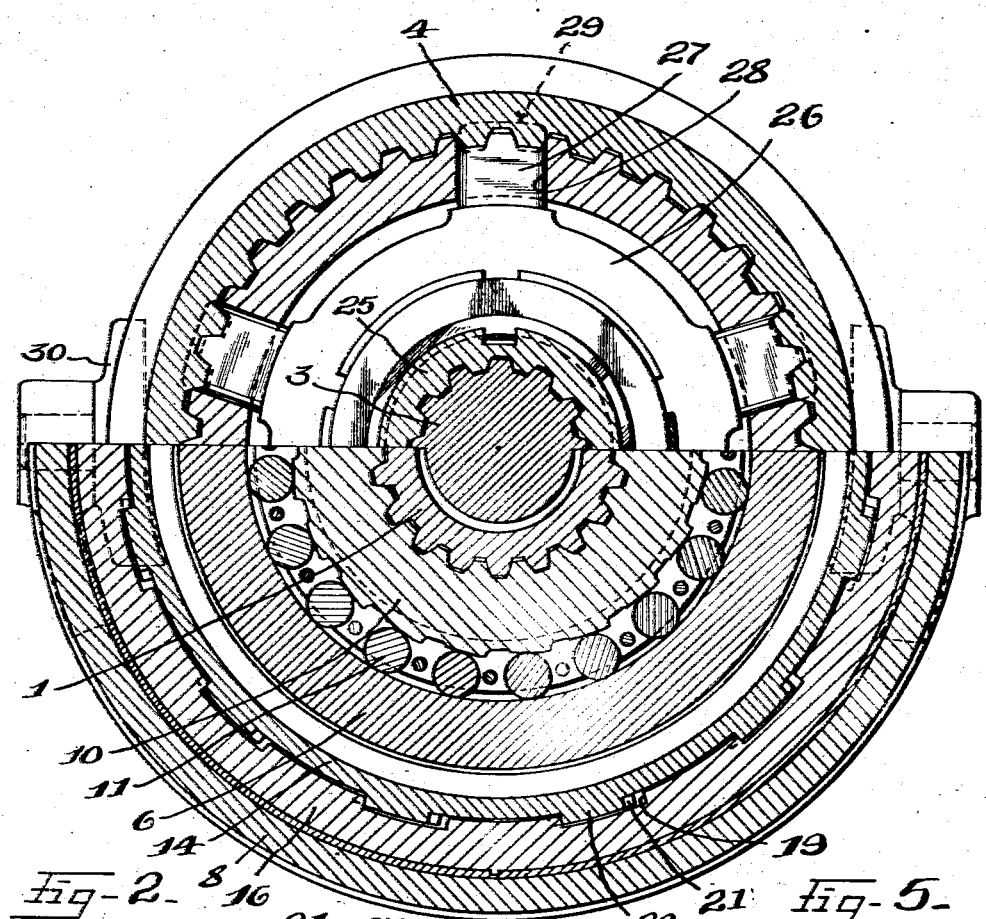
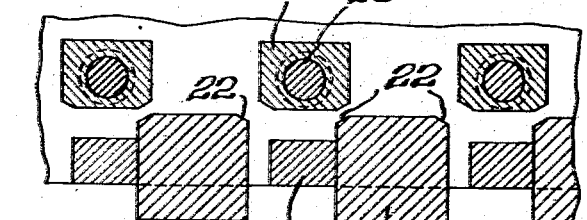
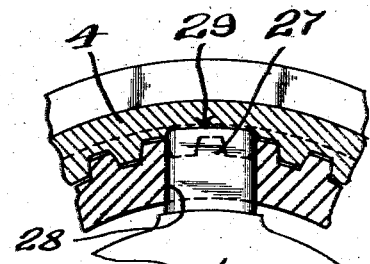
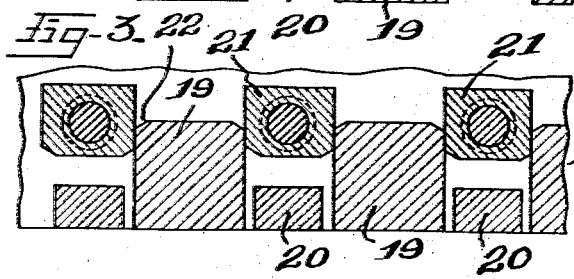

2,363,746

UNITED STATES PATENT OFFICE 2,363,746

SYNCHRONIZING CLUTCH

Carl D. Peterson and Albert H. Deimel, Toledo, Ohio

Application August 7, 1943, Serial No. 497,841

4 Claims. (Cl. 192—53)

This invention relates to synchronizing clutches, and has for its object a new arrangement of the synchronizing ring and the blocking teeth thereon relatively to the coacting teeth of the clutch member with which the synchronizing ring rotates and relative to which it has a limited rocking movement.

The invention further has for its object a particularly simple arrangement of the yielding or spring means between the synchronizing ring and the clutch member with which it rotates and relative to which it has a limited rocking movement, which yielding means permits relative axial shifting of the clutch members to complete the shifting in, after the shiftable clutch member and the synchronizing ring have first shifted as a unit to effect synchronization, preliminary to completing the shifting in.

It further has for its object a compact synchronizing clutch in which the friction elements are of relatively great load capacity for a given diameter.

The invention consists in the novel features and in the combinations and constructions hereinafter set forth and claimed.

In describing this invention, reference is had to the accompanying drawings, in which like characters designate corresponding parts in all the views.

Figure 2 is a sectional view on line 2—2, Figure 1.

Figures 3 and 4 are sectional views on line 3—4, Figure 1, showing the position of the blocking teeth before and after synchronization is effected.

Figure 5 is a sectional view on line 5—5, Figure 1.

Figure 1:
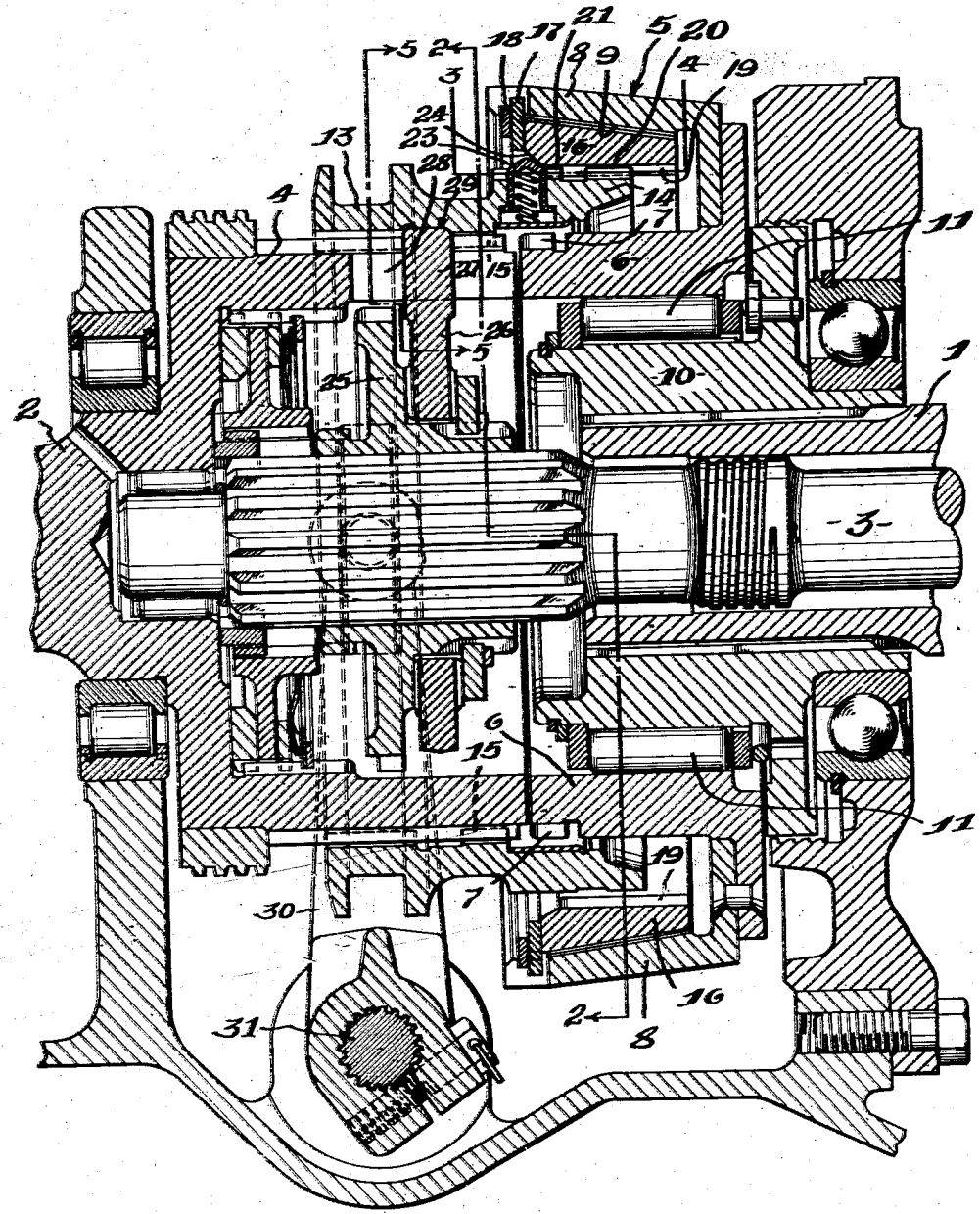
Figure 1 is a fragmentary longitudinal sectional view of a transmission mechanism embodying this synchronizing clutch.

This synchronizing clutch comprises driving and driven members, one of which is suitable axially, a synchronizing ring, coacting blocking teeth on the synchronizing ring and the clutch member with which it rotates and also yielding means between the synchronizing ring and the clutch member with which it rotates. In the illustrated embodiment of our invention, the shiftable member rotates with the driven element or structure of the transmission to which the synchronizing clutch is applied.

1 and 2 designate, respectively, drive and driven structures, shafts or elements, the drive shaft being here shown as a hollow shaft arranged concentric with a shaft 3, the shaft 3 being also a drive shaft, but in so far as this invention for synchronizing clutch is concerned, the shaft 3 is of no consequence. The driven shaft 2 has a head 4 on which the shiftable member of the clutch slides.

5 designates one of the clutch members, in this embodiment of the invention, the driving clutch member, this being rotatable with the shaft 1 and having a hub 6 provided with peripheral clutch teeth 7 and with a friction ring 8 spaced from and overhanging the hub 6 forming an annular recess around the hub 6, the ring 8 being formed with an internal conical friction surface 9. In the illustrated embodiment of the invention, the hub 6 is the outer race of an overrunning clutch, the inner race or cam 10 of which is keyed or splined to the shaft 1. 11 are the rollers between the inner and outer races. The purpose of the overrunning clutch, in the present exemplification, is to permit the hub 6 to overrun, if necessary, when the shaft 2 is being driven by the shaft 3 in a higher gear ratio. 13 designates the shiftable member of the clutch, which is also the driven member in the illustrated embodiment of the invention, this being a clutch collar slidably splined on the head 4 and rotatable therewith, the head 4 being of substantially the same diameter as the hub 6. This clutch member 13 has an extension 14 which encircles the hub 6 within the annular friction ring 8. The ends 15 of the internal splines of the clutch collar 13 constitute clutch teeth for coacting with the clutch teeth 7.

16 designates a synchronizing ring for coacting with the friction face 9 of the ring 8, this extending into the friction ring 8 and held assembled therewith in any suitable manner, as by a retaining ring 17 and a lock ring 18. The synchronizing ring 16 is mounted on the extension 14 of the shiftable collar 13 to rotate therewith and to have a limited rocking movement relatively thereto, the ring 16 being formed with internal blocking teeth 19 and the extension 14 with external teeth or projections 20 located in the spaces between the teeth 19 and of less width than the same, and also with teeth or projections 21 alined in an axial direction with the teeth 20 but fitting the spaces between the teeth 19 with a sliding fit and being normally located out of said spaces, as seen in Figure 3. When the speeds are different, the parts occupy the relative positions illustrated in Figure 3, wherein, upon shifting in, the corners of the projections 21 will be obstructed by the corners of the teeth 19. As the speeds synchronize, the teeth 21 are brought almost into exact alinement with the spaces between the teeth 19 and shifting in can be completed, as illustrated in Figure 4. During this movement, the clutch teeth 15 interlock with the clutch teeth 7 without clashing. The corners of the projections 19 and 21 are beveled, as at 22, at cam angles to facilitate the alining of the projections or teeth 21, and the spaces between the teeth 19, all as will be understood by those familiar with the operation of synchronizing clutches.

The yielding means between the clutch collar 13 and the synchronizing ring 16 is here shown as spring-pressed thimbles or poppets 23 carried by the clutch member or collar 13 and located in the teeth or projections 21 and projecting above the ends of the same, these thimbles or poppets 23 having cam-shaped ends which coact with an annular cam-shaped surface 24 on the rear edge of the synchronizing ring 16. Upon the beginning of the shifting in of the clutch collar 13, the shifting in force is transmitted to the synchronizing ring 16 through the spring-pressed poppets 23 and cam face 24, thus engaging the friction surface of the synchronizing ring 16 with the complemental friction surface 9 of the friction ring 8. These friction surfaces are of sufficient area and location to transmit torque, and hence synchronize the speeds of shafts 1, 2. After the speeds synchronize, the teeth 19 and 21 approach a relative position analogous to that shown in Figure 4, but with the shoulders or teeth 21 out of the spaces between the teeth 19 but nearly alined therewith. Upon continued application of the shifting in force, the cam surfaces 22 will cause the projections 21 and the spaces between the teeth 19 to aline and complete shifting in effected. The clutch collar 13 also operates another clutch member 25 through a fork or spider 26, which has an arm 27 extending through lengthwise slots 28 in the head 4, and which are suitably joined at 29 to the clutch collar to shift axially therewith. This feature forms no part of the invention. The clutch member 25 is part of a balking ring clutch through which the power is transmitted from the shaft 3 directly to the shaft 2. The shafts 1, 3 are usually driven by the same engine, but the shaft 1 through a torque converter having a slipping action and the shaft 3 directly from the crank shaft of the engine. When the synchronizing clutch of this application is engaged, the drive is through the torque converter and the shaft 1, and when the balking ring is engaged, the drive is directly from the shaft 3. However, this invention is directed to the synchronizing clutch capable of transmitting high torque. The clutch collar 13 is shifted by suitable shifting mechanism, as a fork 30 in a rock shaft 31, which may be operated in any suitable manner.

One embodiment of a complete transmission mechanism in which this synchronizing clutch may be used is shown in our pending application, Serial No. 497,839 filed August 7, 1943.

What we claim is:

1. A synchronizing clutch including drive and driven members, one of said members having a hub and a friction ring spaced outwardly radially from the hub, a synchronizing ring rotatable with the other of the said members and having a limited rocking circumferential movement relatively thereto, the hub being formed with clutch teeth, and the other of said members being a collar having internal clutch teeth for coacting with the former clutch teeth and also having an annular portion enclosing the hub and extending into the synchronizing ring, the synchronizing ring having internal blocking teeth, and the collar having external projections extending between said blocking teeth and being of less width than the spaces between the blocking teeth, for permitting limited rocking movement of the synchronizing ring, the collar also having a second set of projections alined, in an axial direction with the former projections for coacting with the blocking teeth and being of substantially the same width as the spaces between the blocking teeth and normally out of said spaces.

2. A synchronizing clutch including drive and driven members, one of said members having a hub and a friction ring spaced outwardly radially from the hub, a synchronizing ring rotatable with the other of the said members and having a limited rocking circumferential movement relatively thereto, the hub being formed with clutch teeth, and the other of said members being a collar having internal clutch teeth for coacting with the former clutch teeth and also having an annular portion enclosing the hub and extending into the synchronizing ring, the synchronizing ring having internal blocking teeth, and the collar having external projections extending between said blocking teeth and being of less width than the spaces between the blocking teeth, for permitting limited rocking movement of the synchronizing ring, the collar also having a second set of projections alined, in an axial direction with the former projections for coacting with the blocking teeth and being of substantially the same width as the spaces between the blocking teeth and normally out of said spaces, and yielding spring means interposed between the clutch collar and the synchronizing ring, the yielding means and the synchronizing ring having coacting cam surfaces.

3. A synchronizing clutch including drive and driven members, one of said members having a hub and a friction ring spaced outwardly radially from the hub, a synchronizing ring rotatable with the other of the said members and having a limited rocking circumferential movement relatively thereto, the hub being formed with clutch teeth, and the other of said members being a collar having internal clutch teeth for coacting with the former clutch teeth and also having an annular portion enclosing the hub and extending into the synchronizing ring, the synchronizing ring having internal blocking teeth, and the collar having external projections extending between said blocking teeth and being of less width than the spaces between the blocking teeth, for permitting limited rocking movement of the synchronizing ring, the collar also having a second set of projections alined, in an axial direction with the former projections for coacting with the blocking teeth and being of substantially the same width as the spaces between the blocking teeth and normally out of said spaces, and yielding spring-pressed poppets carried by the collar and extending radially relative to the axis thereof, the poppets coacting with the synchronizing ring and said coacting parts having coacting inclined cam faces.

4. The combination of driving and driven structures, a synchronizing clutch including driving and driven members having relative axial shifting movement, one of said members being drivingly connected to one of said structures and having a hub provided with clutch teeth and a friction ring spaced outwardly radially from the hub, the other of said structures having a clutch head of substantially the same diameter as the hub, the other of said clutch members being a collar splined on the clutch head and having an extension enclosing said hub, and also having clutch teeth for coacting with the clutch teeth of the hub upon relative axial shifting of one member toward the other, a synchronizing ring rotatable with said other of the clutch members and having a limited rocking circumferential movement relatively thereto and also having a friction face for coacting with the friction ring, the extension of said collar and the synchronizing ring having teeth coacting to block complete shifting-in of the clutch to engage the clutch teeth while the speeds of the driving and driven structures are different and to permit said shifting when the speeds synchronize, and a yielding connection between the extension and the synchronizing ring, normally preventing relative axial movement of the same when the speeds are different and to permit such relative axial shifting when the speeds synchronize.

CARL D. PETERSON.
ALBERT H. DEIMEL.